United States Patent

[11] 3,628,431

[72] Inventor George Irwin
 Highland Park, Ill.
[21] Appl. No. 54,544
[22] Filed July 13, 1970
[45] Patented Dec. 21, 1971
[73] Assignee Imperial Camera Corp.
 Chicago, Ill.

[54] FIRING AND SYNCHRONIZING MECHANISM FOR PERCUSSION-IGNITABLE FLASHLAMPS
 8 Claims, 12 Drawing Figs.

[52] U.S. Cl. ................................................ 95/11.5 R,
 431/93
[51] Int. Cl. ...................................................... G03b 9/70
[50] Field of Search ........................................... 95/11 R, 11
 L, 11.5 R; 431/92, 93; 240/1.3

[56] References Cited
UNITED STATES PATENTS
3,544,250 12/1970 Beach............................ 431/93
3,528,353 9/1970 Colville ........................ 95/11 R

*Primary Examiner*—John M. Horan
*Assistant Examiner*—Kenneth C. Hutchison
*Attorney*—McDougall, Hersh & Scott ABSTRACT: A camera construction including a housing holding a length of film and having film-advancing means and a shutter means for exposing successive frames of film. The shutter means consists of movable plates with an opening defined by one plate for registering with a camera lens opening. A flashbulb of the type which will operate in response to impact from a spring-loaded finger is adapted to flash immediately prior to film exposure. The spring-loaded finger of the flashbulb is operated in timed relationship with the film exposure by means of a push bar which engages the finger in response to engagement of the bar by the movable shutter plates.

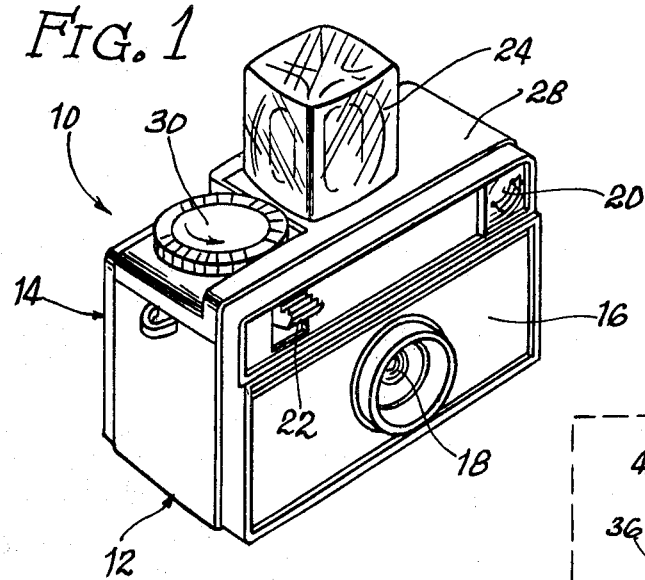
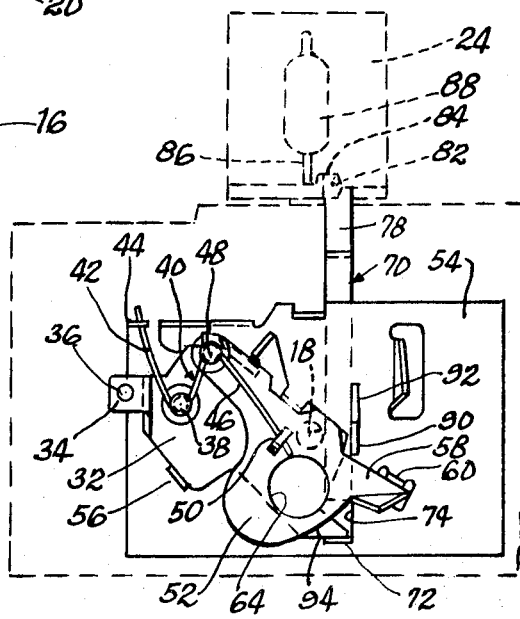
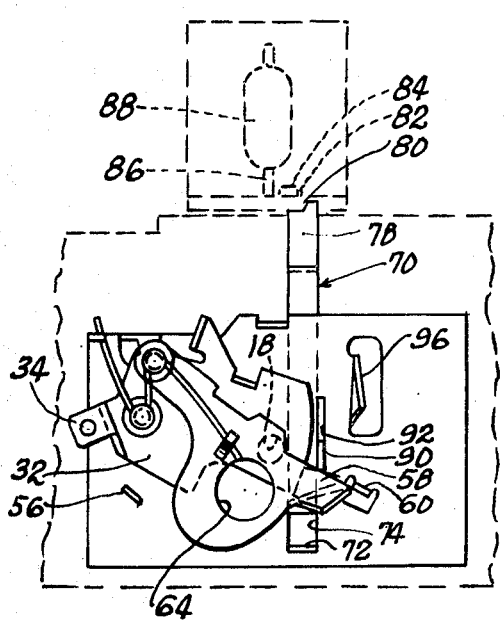
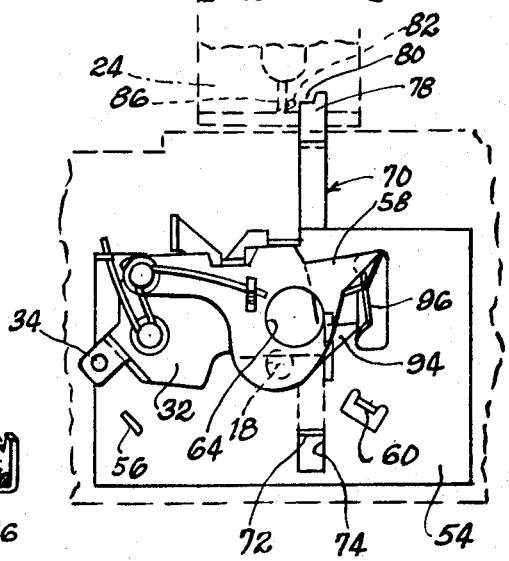
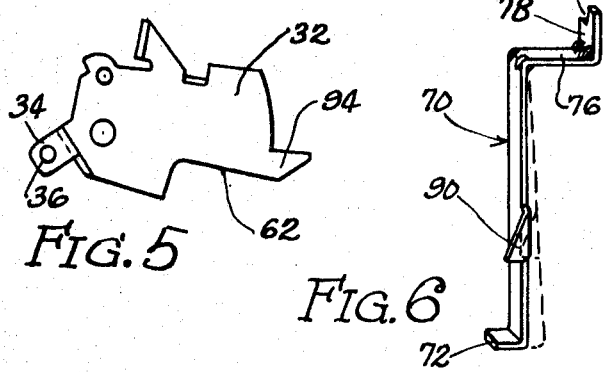
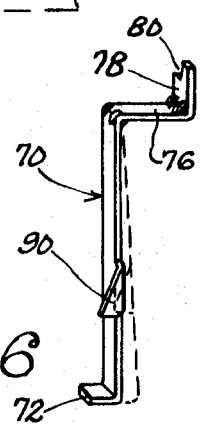

FIRING AND SYNCHRONIZING MECHANISM FOR PERCUSSION-IGNITABLE FLASHLAMPS

This invention relates to a camera construction of the type employing a flashlamp which flashes in response to the shutter operation. The invention is particularly concerned with flashbulb operating means consisting of a spring-loaded finger and bulb firing means normally positioned adjacent the finger. Means are provided for releasing the finger with the firing means operating in response to the resulting impact of the finger against the firing means.

The invention will be particularly described with reference to camera constructions employing flash cubes having the impact firing features. In such cameras, a flashlamp socket is provided for holding the flash cubes. The socket may be tied to the shutter operating means or to the film advancing means of the camera whereby the socket will automatically rotate to position a fresh bulb each time an unexposed film frame is moved to picture taking position. Reference is made to applicant's copending applications Ser. No. 816,951, filed on Apr. 17, 1969, and Ser. No. 864,375, filed Oct. 7, 1969, for reference to camera constructions having mechanisms for manually or automatically positioning flash cubes. It will be understood, however, that the concepts of this invention are suitable for use in conjunction with individual flashbulbs.

It is a general object of this invention to provide an improved mechanism for operating flashbulbs of the impact firing type.

It is a more specific object of this invention to provide a mechanism for firing flashbulbs of the impact firing type which is particularly adaptable for use in camera constructions of the type described in applicant's aforementioned copending applications.

These and other objects of this invention will appear hereinafter and for purposes of illustration, but not of limitation, specific embodiments of the invention are shown in the accompanying drawings in which:

FIG. 1 is a perspective view of a camera construction adapted to employ a flash cube of the impact firing type;

FIG. 2 is an elevational view of shutter and flash bulb firing mechanisms incorporating the features of this invention;

FIG. 3 is an elevational view of the mechanisms of FIG. 2 in an intermediate position;

FIG. 4 is an elevational view of the mechanisms of FIG. 2 in the position achieved after flashbulb firing and film exposure;

FIG. 5 is a detailed view of a shutter plate employed in the mechanism;

FIG. 6 is a detailed perspective view of the bulb firing push bar employed in the mechanism;

Figure 7:
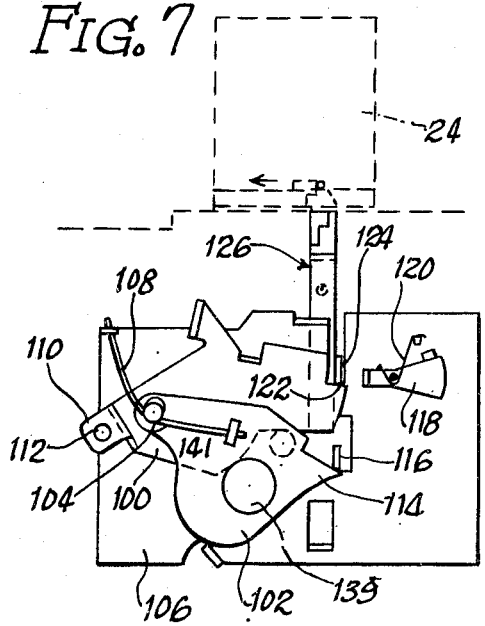
FIG. 7 is an elevational view of a modified form of shutter and bulb firing mechanisms.

THe camera construction of this invention generally comprises a housing for holding a length of film, means for advancing the film to locate successive frames in picture taking position, and shutter means for exposing the successive frames. As described in the aforementioned copending applications, the shutter means comprise movable plates and at least one opening is defined by a plate for registering with a camera lens opening to thereby achieve exposure of a film frame.

A flashbulb socket is defined by the camera for holding a flashbulb or a plurality of bulbs as in the case of a flash cube. The invention is particularly concerned with flashbulbs of the type including a spring-loaded firing finger. In such constructions, the finger is normally restrained by a detent in spaced relationship relative to a bulb firing means. This firing means may comprise a detonating device which will cause flashing of the bulb when subjected to impact. Such impact will result when the spring-loaded finger is caused to move beyond the restraining detent.

In accordance with this invention, cameras of the type described in the aforementioned applications are provided with means for operating flashbulbs of the impact firing type. Specifically, the push bar is incorporated in the camera in a position for engagement with the spring-loaded firing finger. The movable shutter plates are adapted to force the push bar into engagement with the firing finger. The shutter plates and bar are designed so that the push bar will accomplish the firing action in synchronization with the exposure of the film frame. The relationship of the operating parts is such that the time of flash initiation occurs so that peak lighting will coincide with the film exposure.

FIG. 1 illustrates a camera construction 10 comprising a housing 12 having a removable backwall 14. As explained in the aforementioned copending applications, the removable backwall provides access to the interior of the housing for insertion and removal of film.

The front wall 16 of the housing defines a centrally located lens opening 18. A viewing window 20 is provided at one corner of the construction, and a shutter actuating button 22 extends outwardly from the front wall on the side of the camera opposite the viewing window.

A socket is provided for holding a flashbulb construction. In the embodiment illustrated, this construction comprises a flash cube 24 positioned on the top wall 28. The flash cube is provided with four individual bulbs adapted to be successively fired when moved to a firing position. A socket designed to receive a single bulb or other types of multiple bulb structures could be employed in conjunction with the concepts of this invention.

A film advancing wheel 30 is also located on the top wall. The wheel may be connected to means for engaging a film reel mounted within the camera housing so that successive frames of film can be moved to picture taking position. The reel may be a part of a film cartridge as defined in the aforementioned applications or other types of film may be utilized. The flashbulb socket, where multiple bulb structures are employed, may be automatically rotatable with the film or manually movable means may be employed.

FIGS. 2 through 5 illustrate shutter mechanisms which accomplish exposure of the film. The mechanisms include a shutter lever plate 32 which defines an outwardly extending arm 34. As explained in the aforementioned patent disclosures, a pin 36 mounted on the arm 34 is received in a slot defined by a downwardly extending portion of the shutter actuating button 22. When this button is depressed, the plate 32 pivots about the post 38. A spring 40 includes a portion 42 having one end held at 44. The opposite side 46 of the spring bends around the post 48, and the end of this spring portion is held in a slot 50 defined by a second shutter plate 52.

THe post 38 is secured to an interior wall 54 positioned within the camera housing. The post 48 is secured between the plates 32 and 52, this post serving to hold the plates in an assembly. When the shutter button 22 is depressed, the plate 32 moves over the face of the wall 54 during pivoting movement of the post 38. This movement also results in movement of the post 48 whereby the pivot point of the plate 52 will vary.

During downward movement of the shutter button, the portion 42 of the spring 40 opposes pivoting movement of the plate 32 and, therefore, this spring portion operates to return the plate 32 to its normal position when the shutter button is released. A stop 56 extends outwardly from the wall 54 for fixing the normal position of the plate 32.

THe plate 52 defines an outwardly extending finger 58 which normally engages a retaining tab 60 formed in the wall 54. During initial downward movement of the shutter button, the finger 58 is restrained by the tab 60 whereby the plate 52 pivots to the plate 32. This pivoting movement takes place in opposition to the spring portion 46. When the shutter button reaches an intermediate point, the finger 58 reaches the end of the tab 60. Continued movement of the shutter button then releases the finger relative to the tab at which time the spring portion 46 moves the plate 52 rapidly over the face of the plate 32.

THe described action of the plates 32 and 52 provides for exposure of a film frame. Thus, as explained in the aforementioned applications, the film in the camera is positioned behind the wall 54 whereby the plates 32 and 52 are located between the lens opening 18 and the film. In the normal position of the plates shown in FIG. 2, both plates block the opening 18. As the shutter is depressed, however, the cutout portion 62 defined by the plate 32 is moved toward the opening 18. The structure is designed so that the portion 62 crosses the opening 18 at the same time that the finger 58 of the plate 52 reaches the end of the retaining tab 60. Accordingly, the opening 64 defined by the plate 32 will move rapidly across the opening 18 from the position shown in FIG 3 to the position shown in FIG. 4 thereby exposing the film.

In accordance with conventional camera operation, a flash attachment must be designed to operate in proper sequence relative to film exposure. Thus, a flashbulb operation involves an increase of illumination over a period of time to a peak lighting point, the time elapse typically being about 7milliseconds. The period of film exposure is typically about 20milliseconds and flash attachments are, therefore, designed so that flash will be initiated to provide peak lighting within the period of film exposure.

The construction shown in FIGS. 2 through 5 includes means for initiating the flash operation in response to mechanical engagement by the shutter plates whereby a direct relationship between the flash operation and film exposure can be accomplished. The flash initiating means comprise a vertically extending push bar 70 positioned behind the wall 54. A foot 72 is defined by the bottom end of the bar, and this foot extends through a slot 74 in the wall 54. The push bar defines a right angle bend at its upper end to provide an inwardly extending arm 76 defining an upwardly extending portion 78. A notch is defined by this upwardly extending portion whereby a shoulder 80 provides a spring engaging surface. The length of the arm 78 is selected depending on the position of the flashbulb socket whereby the shoulder 80 will be aligned with the bulb impact spring.

The push bar 70 operates in conjunction with the flashbulb structure 24. This structure includes a spring finger 82 which normally presses against a detent 84. A stem 86 defined by a flashbulb 88 includes a detonating means which will react to an impact imparted by the spring finger 82 to thereby initiate operation of the bulb 88.

The push bar 70 defines a triangular tab 90 which extends through a slot 92 defined by the wall 54. The tab 90 is located in position for engagement by the finger 58 defined by the plate 52.

The plate 32 defines a finger 94 which in the normal position of the plate engages the foot 72 of the push bar 70. In the operation of the construction, pivoting movement of the plate 32 moves the finger 94 away from the foot 72 thereby releasing the push bar 70. The firing function of the push bar occurs when the finger 58 moves beyond the retaining tab 60. The resulting rapid movement of the plate 52 causes the finger 58 to engage the tab 90 thereby forcing the bar 70 upwardly whereby the engaging surface 80 of the bar will force the spring finger 82 beyond the detent 84. The spring finger will then snap into engagement with the detonating stem 86 of the bulb 88 to thereby operate the bulb. The finger 58 is located on the plate 52, and the length of the push bar is selected so that the impact of the spring finger will occur at an appropriate time interval prior to film exposure.

The upward movement of the finger 58 forces the tab 90 of the push bar 70 into engagement with the upper edge of the slot 92. The slanted surface of the tab results in a camming action causing inward movement of the push bar as shown in FIG. 6 whereby the finger 58 can bypass the tab. Similarly, the finger 58 will ride over the tab during return movement, and the tab will be positively repositioned by means of the engagement of the finger 94 with the foot 72.

In accordance with conventional structure, a shutter-retarding action may be provided by the outwardly extending cam piece 96 formed in the wall 54. The finger 58 will engage this piece whereby any jarring effect of the shutter plate 52 can be controlled.

Figure 8:
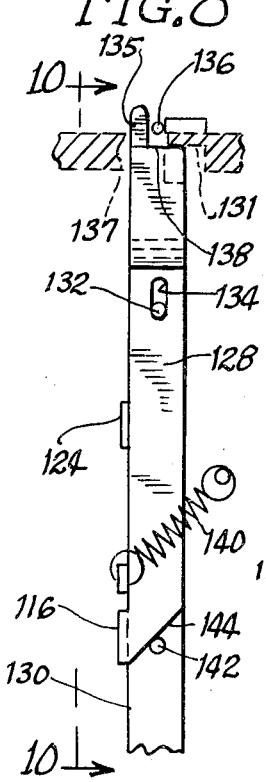
FIG. 8 is an enlarged fragmentary elevational view of the push bar structure employed in the arrangement of FIG. 7.
Figures 9, 10:
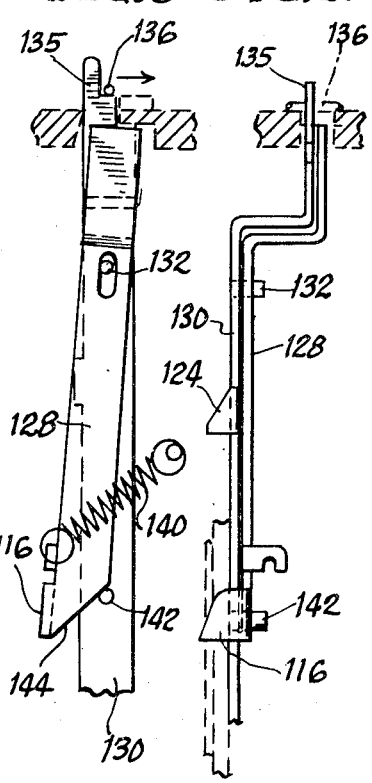
FIG. 9 is an enlarged fragmentary elevational view illustrating the push bar structure of FIG. 8 in the position achieved immediately prior to bulb firing.
FIG. 10 is a side elevational view of the push bar structure taken about the line 10—10 of FIG. 8.

The modification of the invention shown in FIGS. 7 through 9 also involves the use of a pair of shutter plates identified respectively by the numerals 100 and 102. These plates are pivotally connected to a post 104 attached to the stationary wall 106. A spring 108 has one end engaging the wall 106 and the other end attached to the plate 102. The plate 102 is pivotally mounted relative to the plate 100, this pivoting occurring in opposition to the action of the spring.

The plate 100 carries an arm 110 having a pin 112 which fits within a slot defined by the shutter button. In the position shown in FIG. 7, the plate 100 is an intermediate position which is reached after the pushbutton has been moved downwardly and just prior to film exposure.

The plate 102 defines an extending portion 114 which engages a tab 116 extending outwardly from the wall 106. This tab functions in the manner of the tab 60 previously referred to and the edge of the extension 114, therefore, moves over the tab as the plate 102 is pulled along during depression of the shutter button. When the extension 114 has moved beyond the tab 116, then the shutter openings register in the manner previously described. A shutter retarder 118 is engaged by the extension 114 after exposure whereby the rapid movement of the plate 102 is terminated. A spring 120 provides some give in the retarder to eliminate high-impact conditions.

The plate 100 defines a shoulder 122 which engages a tab 124 defined by the push bar assembly 126. It will be appreciated that downward movement of the push bar will operate to raise the tab 124 and the associated push bar assembly.

FIGS. 8, 9 and 10 illustrate the details of the push bar assembly 126. THe assembly includes an upper bar 128 and a lower bar 130. THe lower bar carries a pin 132 which is received in a slot 134 defined by the upper bar. When the plate 100 is pivoted, the bar assembly will move upwardly in response to the engagement of the shoulder 122 with the tab 124. The upward movement of the bar 128 continues until the upper end of this bar engages the ledge 131 defined adjacent an opening defined by the flash cube 24. Continued movement of the bar 130 is permitted because of the relationship of the pin 132 and slot 134.

THe upper end of the bar 130 defines a finger 135 adapted to engage the cam surface 137 of the flash cube. The relationship of the finger and the cam surface insures the entry of the finger in precise relationship with the opening whereby the shoulder 138 defined by the bar is adapted to engage the spring finger 136.

The final movement of the bar 130 is preferably accomplished by the engagement of the extension 114 of the plate 102 with the tab 124. Thus, extension 114 is released from engagement with the tab 116 at which time the extension 114 will rotate rapidly upwardly into engagement with the tab 124, this same movement resulting in registry of the opening 139 in the plate 102 with the camera shutter opening 141.

Release of the plate 102 results through interaction of a pin 142 carried by the bar 130 and cam surface 144 defined by the bar 128. Thus, when the bar 128 engages the ledge 131 and is restrained against further upward movement, the continued upward movement of the bar 130 will drive the pin 142 along the cam surface 144 thereby pivoting the bar 128 and its associated tab 116. The spring 140 resists this pivoting action, and the tension in the spring can be varied to provide a means for controlling the movement of parts.

Relative movement of the bars 128 and 130 is accomplished by means of the pin and slot arrangement. There is also relative pivoting movement of the bar 128 in opposition to the action of spring 140. This pivoting is accomplished by means of a pin 142 carried by the bar 130 and engaging the slanted edge 144 of the bar 128. The pivoting action swings the tab 116 carried by the bar 128 outwardly thereby determining the release point of the extension 114 on plate 102. The structure of FIGS. 7 through 10 is designed so that the bar 130 will push the impact spring finger away from its associated detent substantially simultaneously with the release of the extension 114 so that peak lighting conditions can be realized in proper synchronization with the film exposure.

Figure 11:
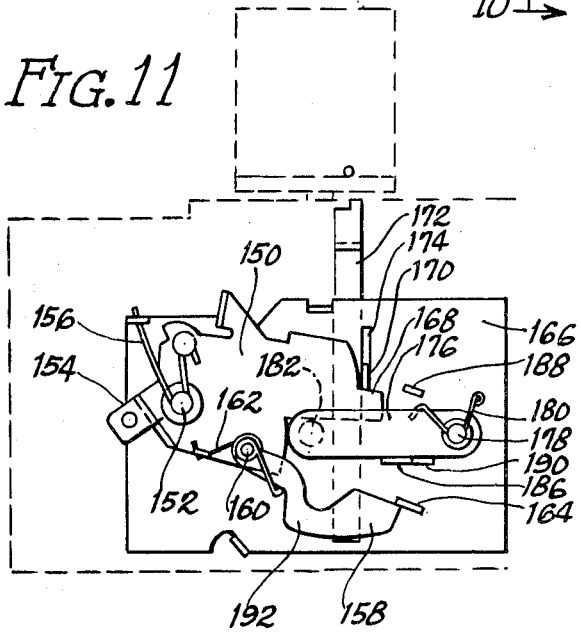
FIG. 11 is an elevational view illustrating a modified form of the invention; and, FIG. 12 is an elevational view of a further alternative form of this invention.

In the modification of the invention shown in FIG. 11, a shutter plate 150, similar in design to the previously described plates, is employed. This plate is pivotally attached at 152 and is normally maintained with the arm 154 extending outwardly at right angles. Thus, the spring 156 resists pivoting movement of the plate which occurs when the arm 154 is pushed downwardly during shutter actuation. The plate and arm are shown in an intermediate position in FIG. 11.

A hammer plate 158 is pivotally attached at 160 to the plate 150. A spring 162 normally urges the plate 158 to pivot counterclockwise relative to the plate 150. A stop tab 164 extends outwardly from wall 166 to normally restrain the plate 158 against pivoting movement.

The plate 150 defines a shoulder 168 which engages a tab 170 formed on the push bar 172. The push bar is situated behind the plate 166, and a slot 174 is defined by the plate for receiving the tab 170 and to permit upward movement of the push bar. A shutter closure plate 176 is pivotally connected at 178 to the wall 166. A spring 180 normally holds the plate 176 in the position shown.

The plate 176 covers the lens opening 182. In the operation of the construction, downward movement of the shutter will pull the hammer plate 158 beyond the stop 164, and this hammer plate 158 beyond the stop 164, and this hammer plate 158 beyond the stop 164, and this hammer plate will then swing upwardly into engagement with the plate 176. A tab 186 is formed on the plate 176 to provide an engaging surface for the plate 158.

The engagement by the hammer plate will swing the plate 176 in opposition to the spring 180 to thereby expose the film. Continued movement of the plate will cause the edge of the plate to bypass the tab 186 thereby returning the plate 176 to the shutter blocking position and thereby limiting the exposure time. A pair of stop tabs 188 and 190 are formed in the wall 166 to limit the movement of the plate 176.

The engagement of the shoulder 168 with the push bar tab 170 will fire the flashbulb in the manner previously described. Alternatively, the hammer plate 158 could be employed to impart the spring finger disengaging movement. This firing action will, in either embodiment, be synchronized with the movement of the hammer plate 158.

Figure 12:
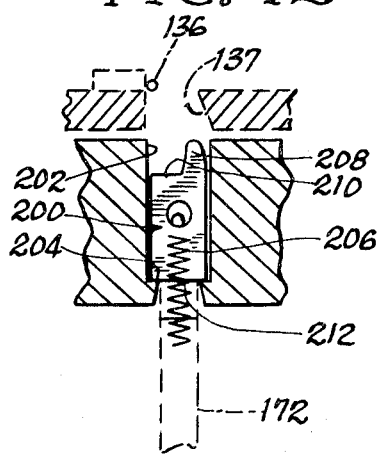

FIG. 12 illustrates a modified form of the invention suitable for use in conjunction with any of the previously described alternative structures. In this modification, a striker bar 200 is retained in a passage 202, the passage defining an annular supporting shoulder 204. A spring 206 having one end tied to the striker and the other end to a surrounding camera portion normally holds the striker in the position shown. The upper end of the striker defines a finger 208, and an impact spring engaging shoulder 210.

The bottom edge 212 of the striker 200 is adapted to be engaged by a push bar of a type previously described, for example a push bar 172. In this instance, the push bar 172 will be shortened since the striker 200 will substitute for the actuating portion of the push bar. The arrangement of FIG. 12 has the advantage of providing a common bulb firing structure which can be used in conjunction with a variety of operating mechanisms. For example, one could substitute the push bar operating structure of FIGS. 1 through 5 for the push bar operating structure of FIG. 11 without in any way changing the striker bar portion of the camera.

It will be understood that various changes and modifications may be made in the above described construction which provide the characteristics of this invention without departing from the spirit thereof.

That which is claimed is:

1. In a camera construction including a housing for holding a length of film, means for advancing the film to locate successive frames thereof in picture taking position, shutter means for exposing the successive frames, said shutter means comprising movable plates with at least one plate defining an opening for registering with a lens opening to achieve exposure of a film frame, a flashlamp socket designed to hold at least one flashbulb, said bulb having a spring-loaded firing finger adapted to be moved beyond a restraining detent and to then engage firing means for the bulb, the improvement comprising means for moving said finger beyond its restraining detent comprising a pusher rod, said shutter means comprising a first pivotally mounted plate movable in response to shutter operation, means defined by said plate for engaging said rod in response to the shutter operation, a second plate pivotally attached to said first plate, spring means connected between said first and second plates, retaining means for holding said second plate against movement with said first plate during shutter operation in opposition to the action of said spring means, continued movement of said first plate operating to release said second plate from said retaining means whereby said second plate moves rapidly relative to said first plate in response to the action of said spring means and wherein said rod operates to move said finger beyond said restraining means substantially simultaneously with the register of said openings whereby peak bulb lighting will occur during exposure of a film frame.

2. A construction in accordance with claim 1 wherein said pusher rod moves said spring finger beyond said restraining detent in response to the engagement of said rod by said first plate.

3. A construction in accordance with claim 1 wherein said second plate defines means for engaging said rod, said spring finger being moved beyond said restraining means in response to the engagement of said rod by said second plate.

4. A construction in accordance with claim 1 wherein said rod defines an outwardly extending tab, said first plate defining an arm engaging said tab for driving said rod toward said spring finger.

5. A construction in accordance with claim 1 wherein said second plate defines an arm, the arm of said second plate engaging said outwardly extending tab during rapid movement of said second plate whereby the arm of said second plate operates to drive said rod for moving said spring-loaded finger beyond said restraining means.

6. A construction in accordance with claim 1 wherein said rod comprises an assembly consisting of first and second push bars, one push bar being movable relative to the other push bar, engagement of said first plate with said assembly operating to move beyond push bars into position adjacent said spring finger, and continued movement of said first plate operating to move said one push bar into engagement with said spring finger for movement of said finger beyond said restraining means.

7. A construction in accordance with claim 6 wherein said other push bar defines a retaining tab, said second plate is retained in position through engagement with said retaining tab on the other push bar, and means for pivoting said other push bar relative to said first push bar to remove said retaining tab out of engagement with aid second plate to provide for release of said second plate.

8. A construction in accordance with claim 1 wherein said second plate comprises a hammer pivotally attached to said first plate, and a shutter closure member pivotally connected to the camera housing, release of said hammer from said retaining means resulting in engagement of the hammer with said shutter closure member to provide for opening of said shutter closure member.

* * * * *